3,723,321
SWEEPING COMPOSITION
David W. Thomas, Ocala, Fla., assignor to NL Industries, Inc., New York, N.Y.
No Drawing. Filed Feb. 16, 1971, Ser. No. 115,833
Int. Cl. C09k 3/22
U.S. Cl. 252—88  11 Claims

ABSTRACT OF THE DISCLOSURE

A free-flowing particulate sweeping composition consists essentially of a homogeneous calcine of hard absorbent angular ceramic grains. The hard absorbent angular ceramic grains are obtained by mechanically reducing lumps of fired material consisting of a homogeneous mixture of clay and feldspathic material. The firing temperature employed is sufficient to fuse the feldspathic material and to impart hardness to the grains, but is insufficient to fuse the clay. This free-flowing sweeping composition may also contain quantities of sand up to about 60% of the mixture.

BACKGROUND OF THE INVENTION

The present invention relates to a sweeping compound and is particularly directed to a sweeping compound for use on the floors in the meat cutting department of large modern food stores and the like. Such cutting room applications require certain characteristics in a sweeping composition.

The sweeping composition must have a high degree of absorbency so that blood, animal fats and greases are absorbed into the sweeping compound which is normally spread on the floor before the work day commences. It is also important that the sweeping composition has an angular grain shape so that the hazard of slipping on the composition is minimized. The grains of the sweeping composition should be hard so that they resist breaking when walked upon since broken grains tend to form a powder which in a moist floor condition produces a slippery mud-like mixture.

The sweeping composition should be substantially bacteria free and may have an antibacterial agent incorporated therein.

Various materials have been commonly employed in sweeping compositions in the past. Sawdust has been employed for many years, principally due to the fact that it is inexpensive and has a high degree of absorbency. Sawdust, is not, however, satisfactory for many applications, since it is totally organic in composition and not only carries bacteria, but also promotes the growth and development of bacteria under moist conditions. Additionally, sawdust has a tendency to cling to one's shoes which is undesirable since it can be tracked into various areas of stores and the like. Furthermore, sawdust has an earthy or "dirty" color which is objectionable.

Sand is commonly used as a sweeping compound. It has however, a number of short-comings, i.e. being non-absorbent and having rounded shape particles which create a slipping hazard. Expanded vermiculite is also common in industrial waste applications where heavy oil is a factor.

This material is readily friable and therefore will be reduced to dust in heavy traffic areas.

A further material which has enjoyed wide-spread use in sweeping compounds are clay minerals and particularly clays of the attapulgite type which are highly absorptive. Clays are not suitable for use in meat cutting room applications, since constant foot movement on the particles of clay in contact with a concrete or tiled floor cause the unfired clay particles to break down and when mixed with the fats, blood and grease, or the like, it soon assumes a mud-like consistency and produces an underfoot hazard. Clay also has an objectional earthy or "dirty" color.

SUMMARY OF THE INVENTION

The sweeping composition of the present invention consists essentially of a substantially homogeneous calcine of hard absorbent angular grains which are obtained by mechanical reduction of substantially homogeneous and cohesive lumps of feldspathic material and clay which have been fired at a temperature sufficient only to fuse the clay. The feldspathic material is present in an amount sufficient to withstand crushing of the grains underfoot.

The amounts of clay and feldspathic material used in forming the hard angular grains are from about 60% to 96% clay, the remainder being the feldspathic material. This sweeping composition may also contain, if desired, quantities of sand up to about 60% by weight of the mixture. The sand particles and the absorbent particles or grains are of substantially similar particle size.

The sweeping composition of the present invention has a high degree of absorbency so that blood, animal fats and grease or the like can readily be absorbed by the sweeping composition. The angular grain shape in the composition minimizes the slipping hazard. The grains are additionally quite hard so that they resist breaking underfoot.

The sweeping composition may be treated with an antibacterial agent so as to be substantially bacteria free and to inhibit the growth and evelopment of bacteria in contact therewith.

DESCRIPTION OF THE PREFERRED EMBODIMENTS

The sweeping composition of the present invention consists essentially of a substantially homogeneous calcine of hard angular absorbent ceramic grains and containing from 0% up to 60% of sand particles.

The ceramic grains are formed by mechanically reducing substantially homogeneous and cohesive lumps of feldspathic material and clay which have been fired at a temperature sufficient only to fuse the feldspathic material but insufficient to fuse the clay. The feldspathic material is present in an amount sufficient to withstand crushing of the grains underfoot.

The clay and feldspathic material are wet mixed to a stiff mud consistency and the material is then formed into lumps as by employing a muller to form irregular lumps or by extruding the material in spaghetti-like configurations. The lumps may also be in the form of small dimension rods or brickettes.

After the material is formed into lumps, it is fired within the range of from 1600° to 2300° F. Material in lump form can be fired in fire clay boxes or saggers, while rods or brickettes can be stacked on kiln cars and fired without saggers. No special "hold" or heat soak is required, and fast turn-over in firing is obtained.

After firing, the material is mechanically reduced in size by feeding it into a hammer mill, a roller mill or a similar grinding machine to achieve particle size reduction. The combination of the firing and mechanical reduction of the material insures the desired angular grain shape.

The reduced material is then screened to provide grains of a size of between about 10 mesh and about 65 mesh. The fines may be plated into a new mix while the coarse material may be returned to be further mechanically reduced in size as discussed hereinabove. No calcined material is lost during the process.

The calcine is then conveyed to a suitable storage area such as a silo or the like. Immediately prior to bagging, the calcine with an absorption quotient from about 20% to about 40% is mixed with various amounts of sand ranging from 0 to 1.5 parts sand for each part of calcine, said sand having a particle size similar to that of the ceramic grain mentioned above.

This mixing may be performed in any conventional mixer. While in the mixer, the calcine grains may be treated (such as i.e. sprayed) with a commercially available germacide or antibacterial agent, such as pine oil.

A sweeping composition according to the present invention was made as set forth in the following examples:

EXAMPLE I

Kaolin and nepheline syenite were wet mixed to a stiff mud consistency and then formed into lumps by employing a muller. After the material was formed into lumps, it was fired at approximately 2000° F. in a sagger.

After firing, the material was mechanically reduced in size by feeding it into a hammer mill to provide the desired angular grain shape. The reduced material was then screened to provide grains of a size of about 30 mesh to about 65 mesh.

Immediately prior to bagging, the calcine was mixed in a mixer with equal parts of sand having a particle size between about 10 mesh and about 65 mesh. While in the mixer, the calcine grains were sprayed with pine oil which comprises an antibacterial agent. About three ounces of pine oil were added for each fifty pounds of the sweeping composition.

EXAMPLE II

A sweeping composition was made according to Example I substituting ball clay for the kaolin and substituting feldspar for the nepheline syenite.

In each of the above examples, a sweeping composition was obtained having a high degree of absorbency and including hard angular grains. Each of the sweeping compositions was substantially free from bacteria and inhibited the growth and development of bacteria in contact therewith.

As this invention may be embodied in several forms without departing from the spirit or essential characteristics thereof, the present embodiment is therefore illustrative and not restrictive.

What is claimed is:
1. A free-flowing particulate sweeping composition consisting essentially of a mixture of about 50% by weight of sand particles and about 50% by weight of calcined hard absorbent angular grains consisting of about 90% by weight of clay and about 10% by weight of feldspathic material.
2. A free-flowing particulate sweeping composition consisting essentially of a mixture of about 0 to 60% by weight of sand particles and about 40 to 100% by weight of calcined hard absorbent angular ceramic grains consisting of about 40 to 96% by weight of clay and about 4 to 60% by weight of feldspathic material.
3. A sweeping composition as defined in claim 2, including an antibacterial agent.
4. A sweeping composition as defined in claim 3, wherein said antibacterial agent comprises pine oil.
5. A sweeping composition as defined in claim 2, wherein said grains are formed by firing a mixture of clay and feldspathic material.
6. Sweeping composition as defined in claim 2 in which the hard absorbent angular grains have an absorption quotient from about 20% to about 40%.
7. A sweeping composition as defined in claim 2, wherein said mixture is fired at a temperature within the range of from 1600° F. to 2300° F.
8. A sweeping composition as defined in claim 7, wherein the clay and feldspathic material are wet mixed and formed into lumps prior to firing.
9. A sweeping composition as defined in claim 2, wherein said feldspathic material is selected from the group consisting of feldspar and nepheline syenite.
10. A sweeping composition as defined in claim 2, wherein said grains are of a size between about 10 and 65 mesh.
11. A sweeping composition as defined in claim 2, wherein the grains of sand are of a size between about 10 and about 65 mesh.

References Cited
UNITED STATES PATENTS

| | | | |
|---|---|---|---|
| 2,728,733 | 12/1955 | Hashimoto | 252—88 X |
| 3,244,634 | 4/1966 | Duke | 252—88 |
| 3,244,635 | 4/1966 | Duke | 252—88 X |
| 1,916,163 | 6/1933 | Worth | 252—88 |
| 2,470,346 | 5/1949 | Frankenhoff | 252—88 |
| 2,805,204 | 9/1957 | Adams | 252—88 |

OTHER REFERENCES

"Sweeping Compounds," Lesser, "Soap & Sanitary Chemicals," December 1951, pp. 144–147, 177.

WILLIAM J. VAN BALEN, Primary Examiner

J. C. GIL, Assistant Examiner

U.S. Cl. X.R.

106—71, 72